United States Patent
Jeong et al.

(10) Patent No.: US 9,350,016 B2
(45) Date of Patent: May 24, 2016

(54) COMPOSITE ANODE ACTIVE MATERIAL, METHOD OF PREPARING THE SAME, AND LITHIUM BATTERY INCLUDING THE COMPOSITE ANODE ACTIVE MATERIAL

(71) Applicant: Samsung SDI Co., Ltd., Yongin, Gyeonggi-Do (KR)

(72) Inventors: Joa-Young Jeong, Yongin (KR); Ji-Heon Ryu, Siheung-si (KR); Gwang-Jin Lee, Seoul (KR); Jong-Uk Kim, Gunsan-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 178 days.

(21) Appl. No.: 13/859,555

(22) Filed: Apr. 9, 2013

(65) Prior Publication Data
US 2014/0057173 A1    Feb. 27, 2014

(30) Foreign Application Priority Data
Aug. 21, 2012   (KR) .................. 10-2012-0091472

(51) Int. Cl.
*H01M 4/36*     (2006.01)
*H01M 4/485*    (2010.01)
*H01M 10/052*   (2010.01)

(52) U.S. Cl.
CPC .............. *H01M 4/366* (2013.01); *H01M 4/485* (2013.01); *H01M 10/052* (2013.01); *Y02E 60/122* (2013.01)

(58) Field of Classification Search
CPC ..... H01M 4/366; H01M 4/131; H01M 4/485; H01M 4/58; H01M 4/136; H01M 4/0471; H01M 4/48; H01M 4/1391
See application file for complete search history.

(56) References Cited

U.S. PATENT DOCUMENTS

| | | | |
|---|---|---|---|
| 8,003,255 B2 | 8/2011 | Inagaki et al. | |
| 2008/0078594 A1 | 4/2008 | Harada et al. | |
| 2009/0301866 A1* | 12/2009 | Zaghib et al. | 204/242 |
| 2010/0224824 A1 | 9/2010 | Gorshkov | |
| 2011/0269025 A1* | 11/2011 | Sun et al. | 429/231.5 |
| 2012/0171570 A1* | 7/2012 | Huang et al. | 429/220 |

FOREIGN PATENT DOCUMENTS

| | | |
|---|---|---|
| JP | 2011-165372 A | 8/2011 |
| KR | 10-2008-0023831 A | 3/2008 |
| KR | 10-2008-0029878 A | 4/2008 |
| KR | 10-2008-0112809 A | 12/2008 |
| KR | 10-2010-0082743 A | 7/2010 |
| KR | 10-2011-0054888 A | 5/2011 |
| KR | 10-2012-0004987 A | 1/2012 |
| KR | 10-2012-0005648 A | 1/2012 |

OTHER PUBLICATIONS

Kim, Jong-Wook et al., "High Rate Performance of the $Li_4Ti_5O_{12}$ Negative Electrod by the Addition of Phosphate Anion," *2012 KECS Spring Meeting and Conference Proceedings Collections of Abstracts*, Kimdaejung Convention Center, Gwangju, The Korean Electrochemical Society, Apr. 12-14, 2012.

* cited by examiner

*Primary Examiner* — Muhammad Siddiquee
(74) *Attorney, Agent, or Firm* — Knobbe Martens Olson & Bear LLP (57) ABSTRACT

In an aspect, a composite anode active material including a lithium titanium oxide; and phosphates, a method of preparing the composite anode active material, and a lithium battery including the composite anode active material is provided.

6 Claims, 7 Drawing Sheets

COMPOSITE ANODE ACTIVE MATERIAL, METHOD OF PREPARING THE SAME, AND LITHIUM BATTERY INCLUDING THE COMPOSITE ANODE ACTIVE MATERIAL

CROSS-REFERENCE TO RELATED APPLICATIONS

This application claims the benefit of Korean Patent Application No. 10-2012-0091472, filed on Aug. 21, 2012 in the Korean Intellectual Property Office, the disclosure of which is incorporated in its entirety herein by reference.

BACKGROUND

1. Field

One or more embodiments of the present disclosure relate to a composite anode active material, a method of preparing the same, a lithium battery including the composite anode active material.

2. Description of the Related Technology

Small, light-weight lithium batteries with high charging and discharging capacities are available for use in portable electronic devices for information communications, such as personal data assistants (PDAs), mobile phones, and laptop computers, or electric bicycles, electric vehicles, and the like.

Lithium batteries such as lithium ion secondary batteries, may be manufactured using materials for a cathode and an anode that allow intercalation or deintercalation of lithium ions, and an organic electrolyte solution or polymer electrolyte solution disposed between the cathode and the anode.

Lithium ion secondary batteries generate electrical energy through oxidation and reduction reactions that take place during intercalation and deintercalation of lithium ions in the anode and cathode.

Lithium ion secondary batteries may use lithium metal as an anode active material, but it may form dendrites causing a short circuit and thus a high risk of failure of the battery. To overcome these shortcomings, carbonaceous materials have been often used as anode materials instead of lithium metals.

Crystalline carbonaceous materials such as natural graphite and artificial graphite, and amorphous carbonaceous materials such as soft carbon and hard carbon are available as carbonaceous materials. Amorphous carbonaceous materials may have high capacities; however, adversely are highly likely to be irreversibly altered in charging and discharging cycles. For this reason, graphite as crystalline carbonaceous material is currently in wide use.

Recently, lithium titanium oxide has been investigated as an anode active material for lithium ion secondary batteries. One such material is a lithium titanium oxide ($Li_4Ti_5O_{12}$) having a higher operating voltage of about 1.5V relative to carbonaceous materials and a theoretical capacity of about 175 mAh/g which is only half the capacity relative to graphite as a crystalline carbonaceous material. Including lithium titanium oxide ($Li_4Ti_5O_{12}$) as an anode active material for lithium ion secondary batteries ensures a high charging and discharging rate with nearly zero irreversible reaction, and provides high stability of the battery because it produces very low reaction heat. Although $Li_4Ti_5O_{12}$ has a higher theoretical density of about 3.5 cc/g relative to carbonaceous materials having a theoretical density of about 2 g/cc, it is similar in capacity per volume as carbonaceous materials.

Furthermore, with the increasing use of lithium ion secondary batteries, as power sources for portable devices, electric vehicles and as large-capacity power storage devices, there is a demand for a material affording a high charging and discharging rate and long lifetime characteristics with a similar capacity per volume as carbonaceous materials as an anode active material for lithium batteries.

SUMMARY

One or more embodiments of the present disclosure include a composite anode active material with improved charging/discharging rate characteristics.

One or more embodiments of the present disclosure include a method of preparing a composite anode active material with improved charging/discharging rate characteristics.

Additional aspects will be set forth in part in the description which follows and, in part, will be apparent from the description, or may be learned by practice of the presented embodiments.

According to one or more embodiments of the present disclosure, a composite anode active material including lithium titanium oxide particles and phosphates on a surface of the lithium titanium oxide particles is provided.

In some embodiments, the phosphates may be dispersed between adjacent particles of the lithium titanium oxide.

In some embodiments, the phosphates may be $Li_3PO_4$.

In some embodiments, the lithium titanium oxide may have a spinel structure.

In some embodiments, the particles of the lithium titanium oxide may be primary particles, and the primary particles may have an average particle diameter of from about 10 nm to about 1000 nm.

In some embodiments, the composite anode active material may include a coating layer including the phosphate oxide on the particle surfaces of the lithium titanium oxide.

In some embodiments, the coating layer may have a thickness of from about 0.1 nm to about 20 nm.

In some embodiments, the composite anode active material may include about 0.1 parts to about 10 parts by weight of a phosphorus (P) based on 100 parts by weight of titanium (Ti).

Some embodiments provide a method of preparing a composite anode active material includes: mixing a lithium source, a titanium source, and a phosphate anion ($PO_4^{3-}$) source together to prepare a precursor mixture; and thermally treating the precursor mixture.

In some embodiments, the lithium source may include at least one selected from the group consisting of $Li_2CO_3$, $LiCl$, $LiNO_3$, $LiC_2O_4$, $(Li)_3PO_4$, $LiOH$, $Li_2SO_4$, and $CH_3COOLi$.

In some embodiments, the titanium source may include at least one selected from the group consisting of rutile $TiO_2$, anatase $TiO_2$, titanium dioxidehydrate ($TiO_2.H_2O$), and $TiO(OH)_2$.

In some embodiments, the phosphate anion ($PO_4^{3-}$) source may include at least one selected from the group consisting of $LiH_2PO_4$, $Li_2HPO_4$, $Li_3PO_4$, $NH_4H_2PO_4$, $(NH_4)_2HPO_4$, and $H_3PO_4$.

In some embodiments for the preparing of the precursor mixture, the phosphate anion ($PO_4^{3-}$) source may be mixed in an amount of from about 0.001 moles to about 0.1 moles based on 1 mole of the titanium source.

In some embodiments, the thermal treating of the precursor mixture may be performed at a temperature of from about 800° C. to about 900° C.

Some embodiments provide a lithium battery includes: a cathode; an anode including the above-described composite anode active material; and an electrolyte disposed between the cathode and the anode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments of a composite anode active material, a method of preparing the same, and a lithium battery including the composite anode active material, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Some embodiments provide a composite anode active material including lithium titanium oxide particles; and phosphates on a surface of the lithium titanium oxide particles.

Unlike carbonaceous materials, lithium titanium oxide does not form solid electrolyte interphase (SEI) from a side reaction with electrolyte, and thus is desirable in term of efficiency, though it may be poor in ion conductivity and electron conductivity.

In this regard, simultaneously introducing metal ions during preparation of lithium titanium oxide in the form of nanoscale may improve ion conductivity and electron conductivity of lithium titanium oxide material.

In some embodiments, the composite anode active material may further include additional metal anions, for example phosphate anions, heterogeneous from titanium, on the surfaces of the lithium titanium oxide particles, so that the lithium titanium oxide may have improved ion conductivity and electron conductivity. In some embodiments, a lithium battery including the composite anode active material may have improved charging-discharging rate characteristics.

In some embodiments, additional phosphate oxide may be dispersed between particles of the lithium titanium oxide. This will be identified below with reference to FIG. 2 and a result of EDS mapping analysis relative to P (phosphorus) included in $PO_4^{3-}$, which is a transmission electron microscopic (TEM) image of a composite anode active material of Example 2 at a ×10,000 magnification taken through transmission electron microscopic-energy dispersive X-ray spectroscopy energy dispersive spectroscopy (TEM-EDS).

Figure 2:
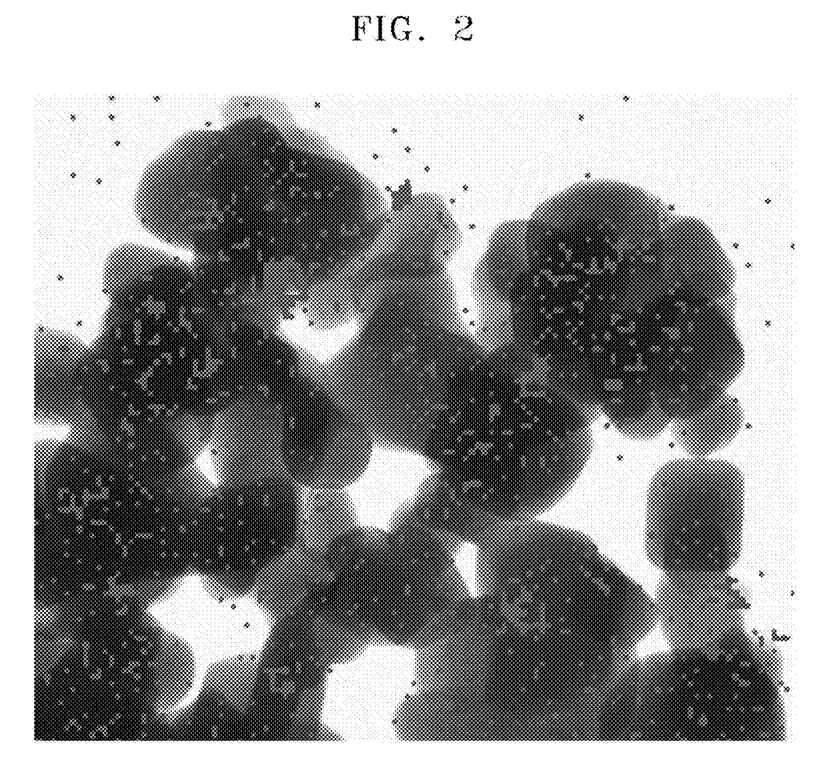
FIG. 2 is a mapping image at a ×10,000 magnification from transmission electron microscopy-energy dispersive X-ray spectroscopy (TEM-EDS) on a composite anode active material of Example 2.

Referring to FIG. 2, in addition to being present on the particle surfaces of the lithium titanium oxide, phosphates are also among adjacent particles of the lithium titanium oxide, for example, at the interfaces of adjacent particles of the lithium titanium oxide, and thus may improve ion conductivity and electron conductivity of the lithium titanium oxide.

In some embodiments, the phosphates may be $Li_3PO_4$. In some embodiments, the phosphates may be produced by reaction of phosphate anions with lithium ions of lithium titanium oxide particles on the surface of the lithium titanium oxide. The phosphates are electrochemically and thermally stable even after deintercalating the lithium ions. Further, charging-discharging rate characteristics of a lithium battery including the phosphates in an anode active material may be improved.

In some embodiments, the lithium titanium oxide may have a spinel structure. In some embodiments, the lithium titanium oxide with the spinel structure may have improved cycle stability and thermal load capacity, and high operational reliability.

In some embodiments, the lithium titanium oxide may be represented by Formula 1 below:

$$Li_{4+x}Ti_{5-y}M_zO_{12-n}$$   Formula 1

In Formula 1 above, $-0.2 \le x \le 0.2$; $-0.3 \le y \le 0.3$; $0 \le z \le 0.3$; $-0.3 \le n \le 0.3$; and M may be selected from the group consisting of lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As). In some embodiments, the lithium titanium oxide may be $Li_4Ti_5O_{12}$.

In some embodiments, the lithium titanium oxide may be primary particles, and the primary particles may have an average particle diameter of from about 10 nm to about 1000 nm. In some embodiments, the primary particles may have an average particle diameter of from about 50 nm to about 800 nm. In some embodiments, the primary particles may have an average particle diameter of from about 100 nm to about 700 nm.

An example of material having these average particle diameter ranges of the lithium titanium oxide are discussed with reference to FIG. 1D, which is a scanning electron microscopic (SEM) image at a ×20,000 magnification of an anode electrode material, i.e., the lithium titanium oxide, of Comparative Example 1. For example, average particle diameters of the primary particles of the lithium titanium oxide may be measured as an average of the largest diameter of each of the thirty particles arbitrarily selected from among the primary particles of the lithium titanium oxide in the SEM image.

When the average particle diameter of the primary particles of the lithium titanium oxide is within these ranges, it may take less for the lithium ions to diffuse into the primary particles.

In some embodiments, the composite anode active material may have a coating layer including the phosphates on the particle surfaces of the lithium titanium oxide. In some embodiments, the coating layer may have a thickness of from about 0.1 nm to about 20 nm. In some embodiments, the coating layer may have a thickness of from about 0.5 nm to about 10 nm. In some other embodiments, the coating layer may have a thickness of from about 1 nm to about 10 nm.

In some embodiments, the coating layer including the phosphates with a thickness of as thin as the above ranges on surfaces of the lithium titanium oxide may have improved ion conductivity and electron conductivity.

In some embodiments, the composite anode active material may include about 0.1 parts to about 10 parts by weight of a phosphorus (P) based on 100 parts by weight of titanium (Ti). For example, the composite anode active material may include about 0.2 parts to about 5 parts by weight of the phosphorus (P) element, and in some embodiment, about 0.5 parts to about 2 parts by weight, based on 100 parts by weight of the titanium (Ti) element.

When the composite anode active material includes phosphorus P within these ranges based on 100 parts by weight of titanium Ti, a lithium battery including the composite anode active material may have improved charging-discharging rate characteristics.

Some embodiments provide a method of preparing the composite anode active material includes; mixing a lithium source, a titanium source, and a phosphate anion ($PO_4^{3-}$) source together to prepare a precursor mixture; and thermally treating the precursor mixture.

In some embodiments, the method of preparing the composite anode active material may include mixing a lithium source, a titanium source, and a phosphate anion ($PO_4^{3-}$) source together to prepare a precursor mixture.

In some embodiments, the lithium source may include at least one selected from the group consisting of $Li_2CO_3$, LiCl, $LiNO_3$, $LiC_2O_4$, $(Li)_3PO_4$, LiOH, $Li_2SO_4$, and $CH_3COOLi$. In some embodiments, the lithium source may be $Li_2CO_3$, LiCl, or $LiNO_3$.

In some embodiments, the titanium source may include at least one selected from the group consisting of rutile $TiO_2$, anatase $TiO_2$, titanium dioxide hydrate ($TiO_2.H_2O$), and TiO$(OH)_2$. In some embodiments, the titanium source may be anatase $TiO_2$.

In some embodiments, the phosphate anion ($PO_4^{3-}$) source may include at least one selected from the group consisting of $LiH_2PO_4$, $Li_2HPO_4$, $Li_3PO_4$, $NH_4H_2PO_4$, $(NH_4)_2HPO_4$, and $H_3PO_4$. In some embodiments, the phosphate anion ($PO_4^{3-}$) source may be $LiH_2PO_4$, $Li_2HPO_4$, or $Li_3PO_4$.

In some embodiments for the preparing of the precursor mixture, the phosphate anion ($PO_4^{3-}$) source may be mixed in an amount of from about 0.001 moles to about 0.1 moles based on 1 mole of the titanium source. In some embodiments for the preparing of the precursor mixture, the phosphate anion ($PO_4^{3-}$) source may be mixed in an amount of from about 0.005 moles to about 0.03 moles based on 1 mole of the titanium source.

When the phosphate anion ($PO_4^{3-}$) source is mixed within these amount ranges based on 1 mole of the titanium source to prepare the composite anode active material, a lithium battery including the composite anode active material may maximize the improvement of charging-discharging rate characteristics.

In some embodiments, the preparing of the precursor mixture may include a process of wet-milling the lithium source, the titanium source, and the phosphate anion ($PO_4^{3-}$) source. Non-limiting examples of the milling method are ball milling and bead milling. Any milling method available in the art may be used.

In some embodiments, the thermal treating of the precursor mixture may be performed at a temperature of from about 800° C. to about 900° C. The thermal treating of the precursor mixture within this temperature range may improve crystallinity of the lithium titanium oxide having nano-scale particle sizes.

In some embodiments, the thermal treating of the precursor mixture may be performed in a $N_2$, CO, $CO_2$, Ar, or $H_2$ gas atmosphere, or in an atmospheric condition at a temperature rise and/or drop rate at from about 1° C./min to about 10° C./min for about 1 hour to about 48 hours.

Some embodiments provide a lithium battery including a cathode; an anode including a composite anode active material as disclosed and described herein, and an electrolyte disposed between the cathode and the anode.

Figure 3:
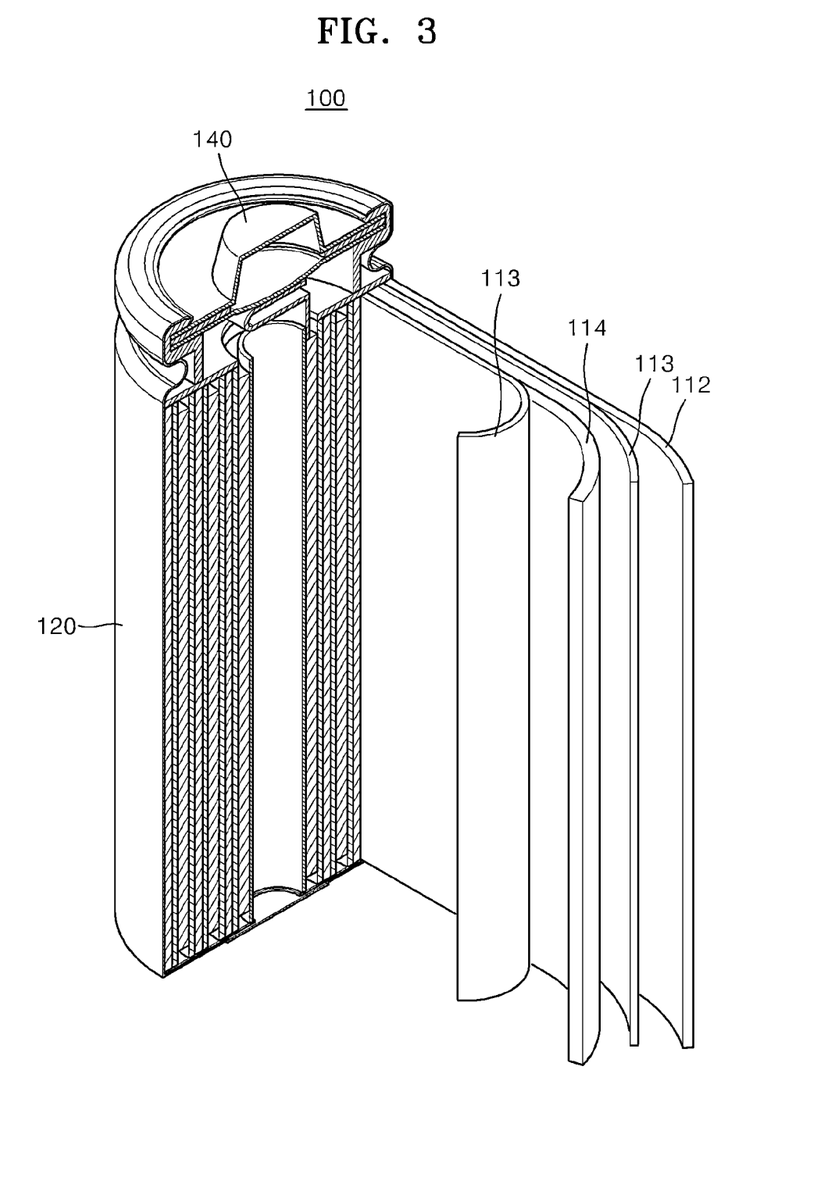
FIG. 3 is an exploded perspective view of a structure of a lithium battery according to an embodiment.

FIG. 3 is an exploded perspective view of a structure of a lithium battery 100 according to an aspect of the present embodiments.

Although the lithium secondary 100 illustrated in FIG. 3 is cylindrical, the present embodiments are not limited thereto. In some embodiments, the lithium secondary batteries may be of a rectangular type or a pouch type.

Lithium secondary batteries may be classified as either lithium ion batteries, lithium ion polymer batteries, or lithium polymer batteries, according to the type of separator and/or electrolyte included therein. In addition, lithium batteries may be classified as either cylindrical type, rectangular type, coin type, or pouch type, according to the shape thereof. Lithium batteries may also be classified as either bulk type or thin film type, according to the size thereof. Lithium secondary batteries according to the present embodiments may have any appropriate shapes.

Referring to FIG. 3, the lithium secondary battery 100 in cylindrical form includes an anode 112, a cathode 114, a separator 113 disposed between the anode 112 and the cathode 114, and an electrolyte (not shown) impregnated into the anode 112, the cathode 114, and the separator 113, a battery case 120, and a sealing member 140 sealing the battery case 120. In some embodiments, the lithium secondary battery 100 may be manufactured by sequentially stacking the anode 112, the cathode 114, and the separator 113 upon one another to form a stack, rolling the stack in a spiral form, and accommodating the rolled up stack in the battery case 120.

In some embodiments, the anode 112 includes a current collector and an anode active material layer disposed on the current collector.

In some embodiments, the current collector for the anode 112 may be a Cu current collector, but is not limited thereto. Examples of the current collector are stainless steel, aluminum, nickel, titanium, thermally-treated carbon, copper or stainless steel that is surface-treated with carbon, nickel, titanium, or silver, and aluminum-cadmium alloys. In some embodiments, the anode current collector may be processed to have fine irregularities on surfaces thereof so as to enhance adhesive strength of the current collector to the anode active material, and may be used in any of various forms including films, sheets, foils, nets, porous structures, foams, and non-woven fabrics.

Examples of the anode active material for forming the anode active material layer are a lithium titanium oxide, and the composite anode active material including phosphates on particle surfaces of lithium titanium oxide as described above.

In some embodiments, the composite anode active material may improve the ion conductivity and electron conductivity of the lithium titanium oxide, and thus improve charging-discharging rate characteristics.

In some embodiments, the phosphates may be dispersed between adjacent particles of the lithium titanium oxide.

Though being mostly present on the particle surfaces of the lithium titanium oxide, the phosphates may also be dispersed between particles of the lithium titanium oxide, for example, at the interfaces of adjacent particles of the lithium titanium oxide, and thus may more improve the ion conductivity and electron conductivity of the lithium titanium oxide, not affecting internal particles of the lithium titanium oxides.

In some embodiments for the anode active material may be the above-described composite anode active material.

In some embodiments for the anode active material layer may also include a binder and a conducting agent.

In some embodiments, the binder strongly binds anode active material particles together and to a current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

In some embodiments, the conducting agent may be used for providing conductivity to the anode. Any electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used along or in a combination of at least two thereof.

Amounts of the anode active material, the binder, and the conducting agent may be those levels normally used in lithium batteries. For example, a weight ratio of the anode active material to a mixture of the conducting agent and the binder may be from about 98:2 to about 92:8. A mixing ratio of the conducting agent to the binder may be from about 1:1.0 to about 1:3, but is not limited thereto.

In some embodiments, the cathode 114 includes a current collector and a cathode active material layer disposed on the current collector.

In some embodiments, an Al (aluminum) current collector may be used as the cathode current collector, but the present invention is not limited thereto. In addition, similar to the anode current collector, the cathode current collector may also be processed to have fine irregularities on a surface thereof so as to enhance the adhesive strength of the cathode current collector to the cathode active material, and may be used in any of various forms, including a film, a sheet, a foil, a net, a porous structure, foam, and non-woven fabric.

The cathode active material is not specifically limited, and may be any cathode active material commonly used in the art. For example, a compound that allows reversible intercalation and deintercalation of lithium. In some embodiments, the cathode active material may include one or more composite lithium oxides with a metal selected from among Co, Mn, Ni, and a combination thereof. In some embodiments, the cathode active material may include one or more compounds represented by the following formulae, including:

$Li_aA_{1-b}B^1{}_bD^1{}_2$ (where $0.90 \leq a \leq 1.8$, and $0 \leq b \leq 0.5$);

$Li_aE_{1-b}B^1{}_bO_{2-c}D^1{}_c$ (where $0.90 \leq a \leq 1.8$, $0 \leq b \leq 0.5$, and $0 \leq c \leq 0.05$);

$LiE_{2-b}B^1{}_bO_{4-c}D^1{}_c$ (where $0 \leq b \leq 0.5$, and $0 \leq c \leq 0.05$);

$Li_aNi_{1-b-c}Co_bB^1{}_cD^1{}_\alpha$ (where $0.90 \leq a \leq 1.8$, $0 \leq b \leq 0.5$, $0 \leq c \leq 0.05$, and $0 < \alpha \leq 2$);

$Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$);

$Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$);

$Li_aNi_{1-b-c}Mn_bB^1{}_cD_\alpha$ (where $0.90 \leq a \leq 1.8$, $0 \leq b \leq 0.5$, $0 \leq c \leq 0.05$, and $0 < \alpha \leq 2$);

$Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$);

$Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$);

$Li_aNi_bE_cG_dO_2$ (where $0.90 \leq a \leq 1.8$, $0 \leq b \leq 0.9$, $0 \leq c \leq 0.5$, and $0.001 \leq d \leq 0.1$.);

$Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$);

$Li_aNiG_bO_2$ (where $0.90 \leq a \leq 1.8$, and $0.001 \leq b \leq 0.1$);

$Li_aCoG_bO_2$ (where $0.90 \leq a \leq 1.8$, and $0.001 \leq b \leq 0.1$.);

$Li_aMnG_bO_2$ (where $0.90 \leq a \leq 1.8$, and $0.001 \leq b \leq 0.1$);

$Li_aMnG_bO_2$ (where $0.90 \leq a \leq 1.8$, and $0.001 \leq b \leq 0.1$.);

$Li_aMn_2G_bO_4$ (where $0.90 \leq a \leq 1.8$, and $0.001 \leq b \leq 0.1$.); $LiQO_2$; $LiQS_2$; $LiV_2O_5$; $LiZO_2$;

$LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In some embodiments, the cathode active material may include $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ (where $0 < x \leq 0.15$ and $0 < y < 0.85$).

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G may be selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; Z may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

In some embodiments, the compounds listed above as cathode active materials may have a coating layer on a surface thereof. Alternatively, a mixture of a compound without having a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. These compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that does not adversely affect the physical properties of the cathode active material when a compound of the coating element is used. In some embodiments, the coating layer may be formed using a spray coating method, a dipping method, or the like.

In some embodiments, the cathode active material layer may include a binder and a conducting agent.

The binder strongly binds cathode active material particles together and to a current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

In some embodiments, the conducting agent may be used for providing conductivity to the anode. Any electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used along or in a combination of at least two thereof.

Amounts of the cathode active material, the binder, and the conducting agent may be those levels normally used in lithium batteries. In some embodiments, a weight ratio of the cathode active material to a mixture of the conducting agent and the binder may be from about 98:2 to about 92:8. In some embodiments, a mixing ratio of the conducting agent to the binder may be from about 1:1.0 to about 1:3, but is not limited thereto.

In some embodiments, the anode 112 and the cathode 114 may be each manufactured by mixing an active material, a binder, and a conducting agent in a solvent to prepare an active material composition, and coating the active material composition on a current collector. N-methylpyrrolidone may be used as the solvent, but the present embodiments are not limited thereto. In some embodiments, an amount of the solvent may be from about 1 part to about 10 parts by weight based on 100 parts by weight of the anode active material or cathode active material.

In some embodiments, a separator may be further disposed between the cathode and the anode, according to the type of the lithium secondary battery. The separator may be a monolayer or a multilayer including at least two layers of polyethylene, polypropylene, polyvinylidene fluoride, or a combination thereof. The multilayer may be a mixed multilayer. In some embodiments, the separator may be a two-layered separator including polyethylene and polypropylene layers, a three-layered separator including polyethylene, polypropylene and polyethylene layers, or a three-layered separator including polypropylene, polyethylene and polypropylene layers.

The cathode active material is not specifically limited, and may be any cathode active material commonly used in the art. For example, a compound that allows reversible intercalation and deintercalation of lithium One or more embodiments of the present disclosure will now be described in detail with reference to the following examples. However, these examples are not intended to limit the scope of the one or more embodiments of the present invention. Technical descriptions that are known to one of ordinary skill in the art will be omitted herein.

EXAMPLES

Preparation of Anode Active Material

Example 1

6.5 g of $Li_2CO_3$ and 17.6 g of anatase $TiO_2$ having a particle size of about 100 nm were added to 30 g of ethanol, followed by an addition of 0.005 moles of $LiH_2PO_4$ based on 1 mole of the anatase $TiO_2$ and prepared a precursor mixture by milling using a planetary ball miller (Pulverisette 6, available from Fritsch, Idar-Oberstein, Germany), together with alumina balls, at about 350 rpm for about 1 hour. After removing the alumina balls, the precursor mixture was dried in a 65° C. vacuum oven to remove ethanol. The dried precursor mixture was put in a 50 mL alumina crucible, and then heated using a muffle furnace (WiseTherm, available from Daihan Science, Seoul, Korea) in the air at about 800° C. at a temperature rise and drop rate of about 5° C./min for about 12 hours affording a composite anode active material with a $Li_3PO_4$ coating layer having a thickness of about 1 nm on surfaces of $Li_4Ti_5O_{12}$ particles having an average diameter of about 620 nm.

Example 2

A composite anode active material having a $Li_3PO_4$ coating layer with a thickness of about 2 nm on surfaces of $Li_4Ti_5O_{12}$ particles having an average diameter of about 650 nm was prepared in the same manner as in Example 1, except that 0.01 moles of $LiH_2PO_4$, instead of 0.005 moles of $LiH_2PO_4$, based on 1 mole of the anatase $TiO_2$, was added prior to the milling using a planetary ball miller (Pulverisette 6), together with alumina balls, at about 350 rpm for about 1 hour.

Example 3

A composite anode active material having a $Li_3PO_4$ coating layer with a thickness of about 5 nm on surfaces of $Li_4Ti_5O_{12}$ particles having an average diameter of about 700 nm was prepared in the same manner as in Example 1, except that 0.03 moles of $LiH_2PO_4$, instead of 0.005 moles of $LiH_2PO_4$, based on 1 mole of the anatase $TiO_2$, was added prior to the milling using a planetary ball miller (Pulverisette 6), together with alumina balls, at about 350 rpm for about 1 hour.

Comparative Example 1

6.5 g of $Li_2CO_3$ and 17.6 g of anatase $TiO_2$ having a particle size of about 100 nm were added to 30 g of ethanol, followed by milling using a planetary ball miller (Pulverisette 6), together with alumina balls, at about 350 rpm for about 1 hour, to prepare a precursor mixture. After removing the alumina balls, the precursor mixture was dried in a 65° C. vacuum oven to remove ethanol. The dried precursor mixture was put in a 50 mL alumina crucible, and then heated using a muffle furnace (WiseTherm) in the air at about 800° C. at a temperature rise and drop rate of about 5° C./min for about 12 hours affording an anode active material $Li_4Ti_5O_{12}$ having an average diameter of about 600 nm.

Manufacture of Lithium Battery

Example 4

The composite anode active material of Example 1, acetylene black (Denka black) conducting agent, and polyvinylidene fluoride (PVDF) as a binder were mixed in a weight ratio of 80:10:10 together with N-methylpyrrolidone (NMP) using a mortar to prepare a slurry. The slurry was coated on an Al current collector to a thickness of about 20 µm using a doctor blade. Then, the resultant mixture was dried in a 120° C. vacuum oven for about 30 minutes, and pressed to manufacture an anode plate with an anode active material layer.

The anode plate was punched into a circular form having a diameter of about 11 mm, which was then dried in a 120° C. vacuum oven for about 10 hours, and used as a working electrode. Lithium cut to a circular form having a diameter of about 14 mm was used as a counter electrode. A polyethylene separator (Cellgard 3510), and an electrolyte including 1.3M $LiPF_6$ dissolved in a mixed solvent of ethylenecarbonate (EC) and ethylmethylcarbonate (EMC) in a 3:7 volume ratio were used to manufacture a coin 1 half-cell having a diameter of about 20 mm.

Example 5

A coin half-cell was manufactured in the same manner as in Example 4, except that an anode plate manufactured using the composite anode active material of Example 2, instead of the anode plate manufactured using the composite anode active material of Example 1, was used to manufacture a working electrode.

Example 6

A coin half-cell was manufactured in the same manner as in Example 4, except that an anode plate manufactured using the composite anode active material of Example 3, instead of the anode plate manufactured using the composite anode active material of Example 1, was used to manufacture a working electrode.

Comparative Example 2

A coin half-cell was manufactured in the same manner as in Example 4, except that an anode plate manufactured using the anode active material of Comparative Example 1, instead of the anode plate manufactured using the composite anode active material of Example 1, was used to manufacture a working electrode.

Morphology and Surface Component Analysis of Anode Active Material

Experimental Example 1

Scanning Electron Microscopic (SEM) Test

A scanning electron microscopic (SEM) test was performed on the anode active materials of Examples 1-3 and Comparative Example 1. The results are shown in FIGS. 1A to 1D.

Figure 1A:
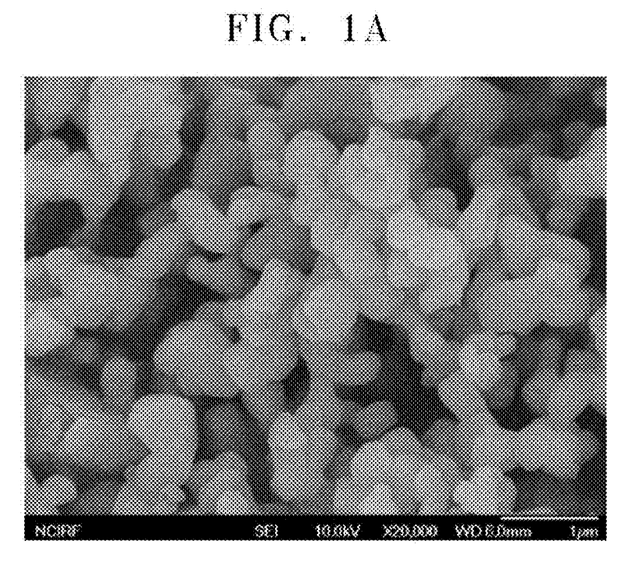
FIGS. 1A to 1D are scanning electron microscopic (SEM) images of anode active materials of Examples 1 to 3 and Comparative Example 1 at a magnification of ×20,000.
Figure 1B:
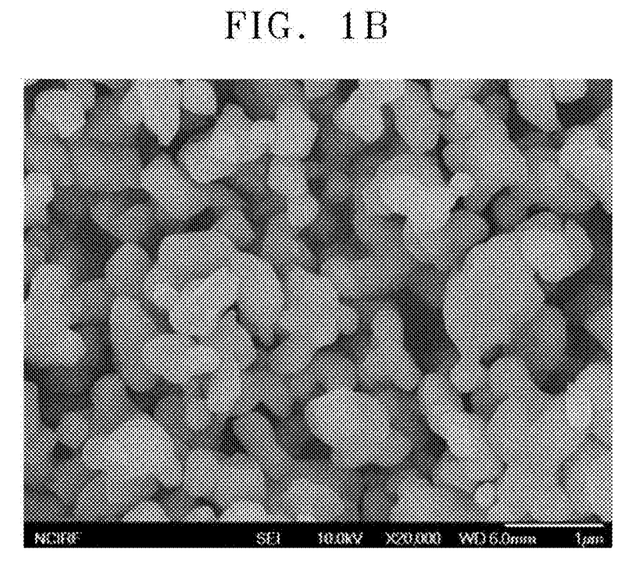
Figure 1C:
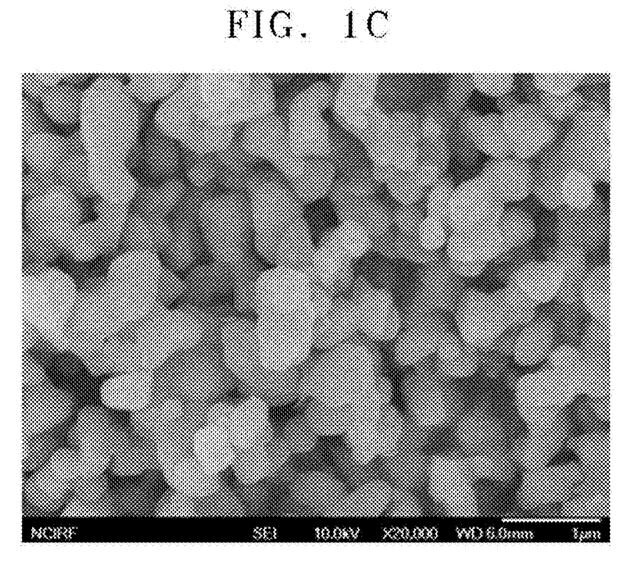

Referring to FIGS. 1A to 1C, the composite anode active materials of Examples 1 to 3 were found to include coating layers of dot-like $Li_3PO_4$ particles on the surfaces of lithium titanium oxide particles having an average particle diameter of from about 600 nm to about 700 nm.

Figure 1D:
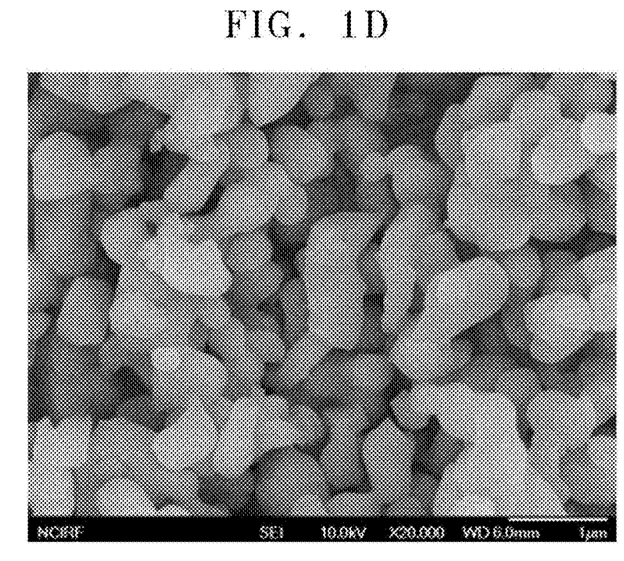

Referring to FIG. 1D, the anode active material of Comparative Example 1 was found to include only lithium titanium oxide particles having an average particle diameter of about 600 nm.

Experimental Example 2

Transmission Electron Microscopic-Energy Dispersive X-Ray Spectroscopic (TEM-EDS) Test TEM-EDS mapping was performed on the composite anode active material of Example 1, using a system (JEM-2100F, available from JEOL, Tokyo, Japan) at an accelerating voltage of about 200 kV and a magnification of about 10,000. The results are shown in FIG. 2.

Referring to FIG. 2, the $Li_3PO_4$ particles were found to be mostly on the particle surfaces of the lithium titanium oxide, with some $Li_3PO_4$ particles present between adjacent lithium titanium oxide particles, i.e., at the interfaces of the lithium titanium oxide particles.

Experimental Example 3

X-Ray Photoelectron Spectroscopic (XPS) Analysis

An X-ray photoelectron spectroscopy (XPS) test was performed on the anode active materials of Examples 2-3 and Comparative Example 1, using a device (Sigma probe, available from Thermo Fisher Scientific, Waltham, Mass.). An X-ray source used was Al Ka (1486.6 eV). The results are shown in FIG. 4.

Figure 4:
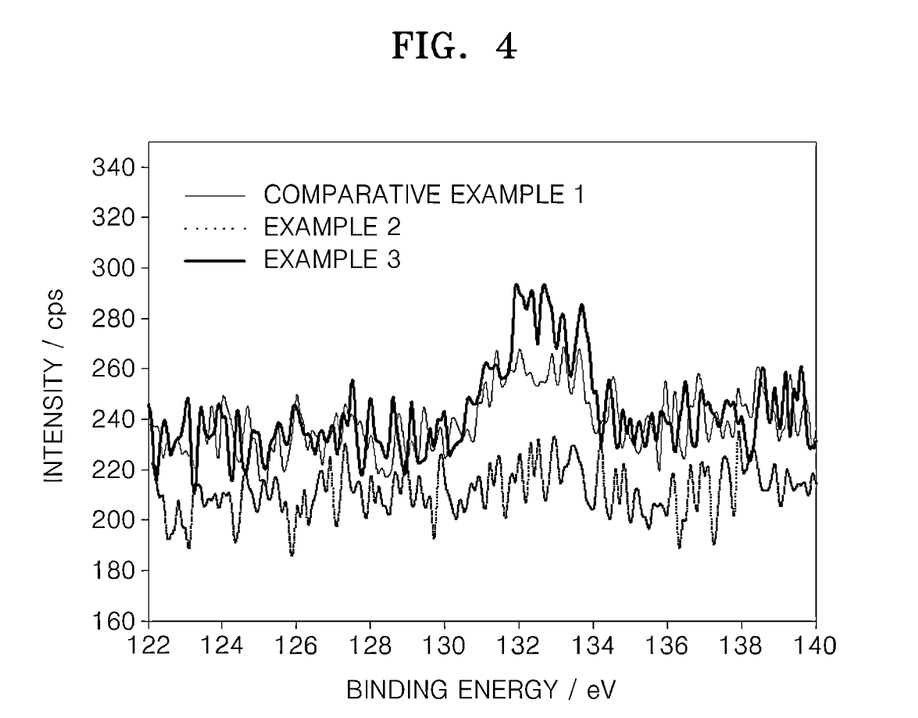
FIG. 4 is a graph illustrating a result of X-ray photoelectron spectroscopic (XPS) analysis on the anode active materials of Examples 2 and 3 and Comparative Example 1.

Referring to FIG. 4, the composite anode active materials of Examples 2 and 3 with the $Li_3PO_4$ coating layers on the particle surfaces of lithium titanium oxide have a peak of a 2p orbital binding energy for phosphorus at about 132-133 eV, which identifies the presence of $Li_3PO_4$ costing layer on the particle surfaces of the lithium titanium oxide.

Experimental Example 4

Inductively Coupled Plasma (ICP) Analysis

Inductively coupled plasma (ICP) analysis was performed on the anode active materials of Examples 1 to 3 and Comparative Example 1, using a system (Optima-4300 DV, available from PerkinElmer, Waltham, Mass.).

Based on Ti content and P content in the anode active materials of Examples 1 to 3 and Comparative Example 1 obtained from the ICP analysis, the relative phosphorus (P) content in each anode active material was calculated with respect to 100 parts by weight of the titanium (Ti) content. The results are shown in Table 1 below.

TABLE 1

| Example | P content based on 100 parts by weight of Ti content (parts by weight) |
|---|---|
| Example 1 | 0.5 |
| Example 2 | 0.8 |
| Example 3 | 2.1 |
| Comparative Example 1 | 0 |

Referring to Table 1 above, the anode active materials of Examples 1 to 3 are found to include about 0.5 to 2.1 parts by weight of phosphorus (P) based on 100 parts by weight of titanium (Ti), whereas no phosphorus (P) was detected from the anode active material of Comparative Example 1.

Lithium Battery Performance Test

Evaluation Example 1-1

Evaluation of Charging-Discharging Rate—Charging Rate Characteristics

After being kept at room temperature (25° C.) for about 10 hours, the coin half cells of Examples 4-6 and Comparative Example 1 were subjected to an evaluation of charging-discharging rate characteristics.

Based on a theoretical capacitance of 175 mAh/g for $Li_4Ti_5O_{12}$, a 1C current was set to 175 mA/g, and charging and discharging were performed at a constant current of 0.1C in a voltage range of 2.5~1.0 V (vs. Li/Li+). That is, a cycle of charging (intercalation of Li+) and discharging (deintercalation of Li+) was repeated three times, with a rest time for 10 minutes between cycles.

Charging capacities of the coin half-cells of Examples 4 to 6 and Comparative Example 2 were measured with a stepwise increase in current level from 0.1C to 10C in the same pattern during charging and discharging (0.1C-0.2C-0.5C-1C-2C-5C-10C-0.1C, from 17.5 mA/g to 1750 mA/g). The results are shown in Table 2 and FIG. 5.

A charging capacity retention rate of each battery was calculated based on the results, according to Equation 1 below:

$$\text{Charging capacity retention rate}(\%) = (\text{Charging capacity at 5C})/(\text{Charging capacity at 0.1C}) \times 100 \quad \text{Equation 1}$$

TABLE 2

| Example | Charging capacity at 0.1 C (mAh) | Charging capacity at 5 C (mAh) | Charging capacity retention rate (%) |
|---|---|---|---|
| Example 4 | 146 | 67 | 45.9 |
| Example 5 | 143 | 69 | 48.3 |
| Example 6 | 133 | 61 | 45.9 |
| Comparative Example 2 | 153 | 30 | 19.6 |

Figure 5:
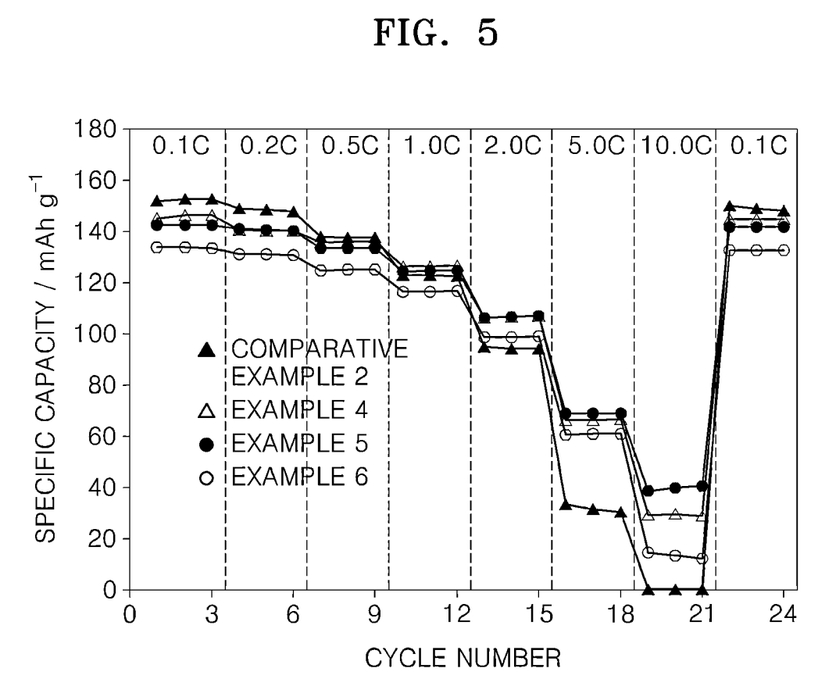
FIG. 5 is a graph illustrating charging rate characteristics of lithium batteries of Examples 4 to 6 an Comparative Example 2.

Referring to Table 2 and FIG. 5, the charging capacity retention rates of the coin half-cells of Examples 4, 5, and 6 were 45.9%, 48.3%, and 45.9%, respectively, and the charging capacity retention rate of the coin half-cell of Comparative Example 2 was 19.6%, as calculated using Equation 1 above.

These results indicate that the coin cell half batteries of Examples 4 to 6 have improved charging and discharging rate characteristics, and in particular, improved charging rate characteristics, as compared with the coin half-cell of Comparative Example 2.

Evaluation Example 1-2

Evaluation of Charging-discharging Rate Characteristics—Discharging Rate Characteristics After being kept at room temperature (25° C.) for about 10 hours, the coin half-cells of Examples 4-6 and Comparative Example 2 were subjected to an evaluation of charging-discharging rate characteristics.

Based on a theoretical capacitance of 175 mAh/g for $Li_4Ti_5O_{12}$, a 1C current was set to 175 mA/g, and charging and discharging were performed at a constant current of 0.1C in a voltage range of 2.5~1.0 V (vs. Li/Li+). That is, a cycle of charging (intercalation of Li+) and discharging (deintercalation of Li+) was repeated three times, with a rest time for 10 minutes between each cycle.

Discharging capacities of the coin half-cells of Examples 4 to 6 and Comparative Example 2 were measured with a constant current of 0.1C during charging and a stepwise increase in current from 0.1C to 10C during discharging. The results are shown in Table 3 and FIG. 6.

A discharging capacity retention rate of each battery was calculated based on the results, according to Equation 2 below.

$$\text{Discharging capacity retention rate}(\%) = (\text{Discharging capacity at 5C})/(\text{Discharging capacity at 0.1C}) \times 100 \quad \text{Equation 2}$$

TABLE 3

| Example | Discharging capacity at 0.1 C (mAh) | Discharging capacity at 5 C (mAh) | Discharging capacity retention rate (%) |
|---|---|---|---|
| Example 4 | 144 | 135 | 93.8 |
| Example 5 | 141 | 136 | 96.5 |
| Example 6 | 132 | 121 | 91.7 |
| Comparative Example 2 | 140 | 37 | 26.4 |

Figure 6:
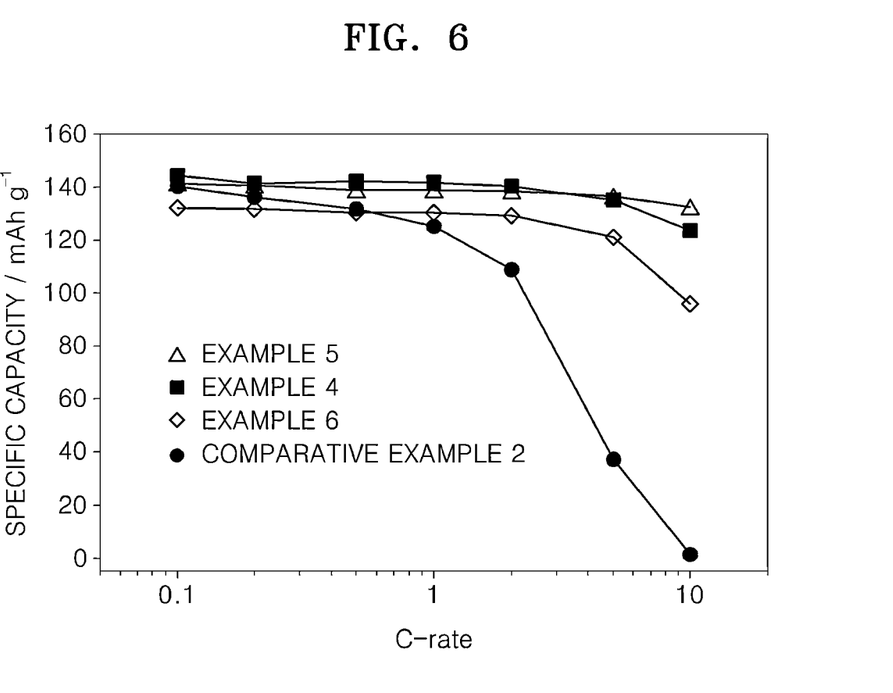
FIG. 6 is a graph illustrating discharging rate characteristics of the lithium batteries of Examples 4-6 and Comparative Example 2.

Referring to Table 3 and FIG. 6, the discharging capacity retention rates of the coin half-cells of Examples 4, 5, and 6 were 93.8%, 96.5%, and 91.7%, respectively, and the discharging capacity retention rate of the coin half-cell of Comparative Example 2 was 26.4%, as calculated using Equation 2 above.

These results indicate that the coin half-cells of Examples 4 to 6 have improved charging and discharging rate characteristics, and in particular, improved discharging rate characteristics, as compared with the coin half-cell of Comparative Example 2.

As described above, according to the one or more embodiments of the present invention, when a phosphate compound is included to prepare the composite anode active material as disclosed and described herein, a lithium battery including the composite anode active material may have improved charging and discharging rate characteristics.

In the present disclosure, the terms "Example," "Comparative Example" and "Experimental Example" are used arbitrarily to simply identify a particular example or experimentation and should not be interpreted as admission of prior art. While this disclosure has been described in connection with what is presently considered to be practical exemplary embodiments, it should be understood that invention is not limited to the exemplary embodiments and is intended to cover various modifications and equivalent arrangements included within the spirit and scope of the appended claims. Descriptions of features or aspects within each embodiment should typically be considered as available for other similar features or aspects in other embodiments.

What is claimed is:

1. A composite anode active material consisting of lithium titanium oxide particles; and a phosphate layer on a surface of the lithium titanium oxide particles and phosphate particles between adjacent lithium titanium oxide particles.

2. The composite anode active material of claim 1, wherein the phosphate layer is $Li_3PO_4$.

3. The composite anode active material of claim 1, wherein the lithium titanium oxide particles have a spinel structure.

4. The composite anode active material of claim 1, wherein the lithium titanium oxide particles are primary particles having an average particle diameter of from about 10 nm to about 1000 nm.

5. The composite anode active material of claim 1, wherein the coating layer has a thickness of from about 0.1 nm to about 20 nm.

6. A lithium battery comprising:
   a cathode;
   an anode including the composite anode active material of claim 1; and
   an electrolyte disposed between the cathode and the anode.

* * * * *